United States Patent
Stahr et al.

(10) Patent No.: US 11,383,686 B2
(45) Date of Patent: Jul. 12, 2022

(54) BISTABLE SOLENOID VALVE FOR A HYDRAULIC BRAKE SYSTEM, AND METHOD FOR ACTUATING A VALVE OF THIS TYPE

(71) Applicant: Robert Bosch GmbH, Stuttgart (DE)

(72) Inventors: Wolf Stahr, Abstatt (DE); Klaus Landesfeind, Bangalore (IN); Massimiliano Ambrosi, Abstatt (DE); Michael Eisenlauer, Affalterbach (DE); Edgar Kurz, Heilbronn-Horkheim (DE); Wolfgang Schuller, Cleebronn (DE)

(73) Assignee: Robert Bosch GmbH, Stuttgart (DE)

( * ) Notice: Subject to any disclaimer, the term of this patent is extended or adjusted under 35 U.S.C. 154(b) by 206 days.

(21) Appl. No.: 16/613,929

(22) PCT Filed: Jun. 27, 2018

(86) PCT No.: PCT/EP2018/067193
§ 371 (c)(1),
(2) Date: Nov. 15, 2019

(87) PCT Pub. No.: WO2019/011652
PCT Pub. Date: Jan. 17, 2019

(65) Prior Publication Data
US 2021/0331654 A1      Oct. 28, 2021

(30) Foreign Application Priority Data
Jul. 14, 2017    (DE) ..................... 10 2017 212 084.3

(51) Int. Cl.
*F16K 31/06*     (2006.01)
*B60T 8/36*      (2006.01)
(Continued)

(52) U.S. Cl.
CPC .............. *B60T 8/363* (2013.01); *B60T 17/04* (2013.01); *F16K 31/0655* (2013.01);
(Continued)

(58) Field of Classification Search
CPC .... F16K 31/0655; F16K 31/08; H01F 7/1615; H01F 7/1646; H01F 2007/1692; H01F 2007/1669; B60T 8/363; B60T 17/04
See application file for complete search history.

(56) References Cited

U.S. PATENT DOCUMENTS 3,203,447 A * 8/1965 Bremner ............... F16K 31/082
                                                              137/595
3,895,331 A * 7/1975 Saarem ................. H01F 7/1607
                                                              335/253
(Continued)

FOREIGN PATENT DOCUMENTS

CN              1085297 A       4/1994
DE       10 2006 047 920 A1    4/2008
(Continued)

OTHER PUBLICATIONS

International Search Report corresponding to PCT Application No. PCT/EP2018/067193, dated Sep. 18, 2018 (German and English language document) (6 pages).

*Primary Examiner* — Matthew W Jellett
(74) *Attorney, Agent, or Firm* — Maginot, Moore & Beck LLP (57) ABSTRACT

A bistable solenoid valve for a hydraulic brake system, includes a guide sleeve, in which an upper and a lower non-moving pole core are arranged fixedly and a closing element is arranged movably, wherein the closing element penetrates into a valve seat during a closing movement and lifts up from the valve seat during an opening movement. The closing element is connected fixedly to a permanent magnet, wherein the permanent magnet is positioned
(Continued)

between the lower and the upper pole core. A coil group is positioned around the guide sleeve and substantially encloses the guide sleeve. The coil group includes at least two coils, wherein the coil group is configured in such a way that an actuation of a movement of the closing element takes place by means of an activation of the at least two coils.

14 Claims, 3 Drawing Sheets

(51) Int. Cl.
 *B60T 17/04* (2006.01)
 *F16K 31/08* (2006.01)
 *H01F 7/16* (2006.01)
(52) U.S. Cl.
 CPC ........... *F16K 31/08* (2013.01); *H01F 7/1615* (2013.01); *H01F 7/1646* (2013.01); *H01F 2007/1669* (2013.01); *H01F 2007/1692* (2013.01)

(56) References Cited

U.S. PATENT DOCUMENTS

| 4,403,765 | A | * | 9/1983 | Fisher | F16K 31/082 |
| | | | | | 137/625.65 |
| 4,422,060 | A | * | 12/1983 | Matsumoto | H01F 7/13 |
| | | | | | 335/234 |
| 4,524,797 | A | * | 6/1985 | Lungu | F16K 31/082 |
| | | | | | 137/343 |
| 4,690,371 | A | * | 9/1987 | Bosley | F16K 31/082 |
| | | | | | 251/129.01 |
| 5,734,310 | A | * | 3/1998 | Ankney | H01F 7/121 |
| | | | | | 335/228 |
| 5,947,155 | A | * | 9/1999 | Miki | H01F 7/1615 |
| | | | | | 137/625.65 |
| 7,004,446 | B2 | * | 2/2006 | Petro | F16K 31/086 |
| | | | | | 251/63.4 |
| 8,710,945 | B2 | * | 4/2014 | Wygnanski | H01F 7/1646 |
| | | | | | 335/229 |
| 2009/0114864 | A1 | * | 5/2009 | Scheffer | F01N 3/208 |
| | | | | | 251/129.15 |
| 2011/0001591 | A1 | * | 1/2011 | Puth | H01F 7/1615 |
| | | | | | 335/229 |
| 2011/0248804 | A1 | | 10/2011 | Wygnanski | |
| 2012/0273707 | A1 | * | 11/2012 | Vier | F16K 31/0665 |
| | | | | | 251/129.15 |
| 2017/0074418 | A1 | | 3/2017 | Liang et al. | |

FOREIGN PATENT DOCUMENTS

| DE | 10 2006 061 947 A1 | 7/2008 |
| DE | 10 2008 000 534 A1 | 9/2009 |
| EP | 2 525 122 A1 | 11/2012 |

* cited by examiner

BISTABLE SOLENOID VALVE FOR A HYDRAULIC BRAKE SYSTEM, AND METHOD FOR ACTUATING A VALVE OF THIS TYPE

This application is a 35 U.S.C. § 371 National Stage Application of PCT/EP2018/067193, filed on Jun. 27, 2018, which claims the benefit of priority to Serial No. DE 10 2017 212 084.3, filed on Jul. 14, 2017 in Germany, the disclosures of which are incorporated herein by reference in their entirety.

The present disclosure relates to a bistable solenoid valve for a hydraulic brake system, comprising a guide sleeve in which an upper and a lower non-moving pole core are arranged in a fixed manner and a closing element is arranged in a movable manner, wherein the closing element enters a valve seat during a closing movement and lifts out of the valve seat during an opening movement, and the closing element is connected to a permanent magnet in a fixed manner, wherein the permanent magnet is positioned between the lower and the upper pole core, and a coil group is positioned around the guide sleeve and substantially encloses said guide sleeve, wherein the solenoid valve is characterized in that the coil group comprises at least two coils, wherein the coil group is configured such that actuation of a movement of the closing element takes place by means of activation of the at least two coils.

BACKGROUND

In a hydraulic unit, solenoid valves have the task of retaining the pressure medium or allowing said pressure medium to flow out. The hydraulic units typically consist of a plurality of solenoid valves. In the case of solenoid valves in ABS/TCS/ESP systems of motor vehicles, certain requirements in respect of leaktightness are in place for the closed state, said requirements being dependent on the respective task of the solenoid valve in the system. The valves are generally designed such that, depending on the function, a permanent position is achieved in a deenergized switching position (for example "closed" in a deenergized state) and the valve is energized only for short-term operation (for example "open" in the energized state).

The prior art further discloses bistable valves which achieve a permanent position in a deenergized state in two switching positions and are energized only for the switching process between the permanent positions. In this respect, reference may be made to patent application DE 10 2006 061 947 for example.

SUMMARY

In contrast, the valve according to the disclosure and the method according to the disclosure advantageously render possible highly dynamic and efficient switching of a bistable solenoid valve, even at low temperatures.

According to the disclosure, this is rendered possible owing to the features specified herein. Further refinements of the valve and method are also disclosed herein.

The bistable solenoid valve according to the disclosure for a hydraulic brake system, comprising a guide sleeve in which an upper and a lower non-moving pole core are arranged in a fixed manner and a closing element is arranged in a movable manner, wherein the closing element enters a valve seat during a closing movement and lifts out of the valve seat during an opening movement, and the closing element is connected to a permanent magnet in a fixed manner, wherein the permanent magnet is positioned between the lower and the upper pole core, and a coil group is positioned around the guide sleeve and substantially encloses said guide sleeve, is characterized in that the coil group comprises at least two coils, wherein the coil group is configured such that actuation of a movement of the closing element takes place by means of activation of the at least two coils.

This is understood to mean that the solenoid valve has two pole cores between which a permanent magnet is positioned. In this case, the pole cores are fixedly defined in their position and the permanent magnet can move in an axial manner between the pole cores. In this case, the permanent magnet is connected to the closing element of the solenoid valve in a fixed manner. The closing element, also called sealing element, serves to allow passage at the valve seat and therefore to open the valve in a first position, and to block passage at the valve seat and therefore to close the valve in a second position. The solenoid valve is bistable. This means that holding the closing element in these two different positions (that is to say in the closed position and also in the open position) can take place without permanent energization. In the case of a bistable valve, only a changeover of the switching state is rendered possible by energizing the coils. Holding the closing element in the respective closed or open position takes place, for example, using magnetic force. In this case, the valve or the closing element is held in the open position by a permanent magnet at the upper pole core. Analogously, the valve, or the closing element, is held in a closed position by this permanent magnet at the lower pole core. In this way, the valve can advantageously be held in the respective position in an energy-efficient manner.

Changing between the two stable positions takes place owing to a movement of the closing element. To this end, the coils are each energized with a defined voltage. A magnetic field is created owing to the energization of a coil. The two pole cores consist, for example, of a material which has ferromagnetic properties. Therefore, the magnetic fields magnetize the upper and the lower pole core. On account of their temporary magnetization, the upper and the lower pole core have an influence on the permanent magnet, so that the associated closing element is moved to the desired position. The closing element itself consists of a non-magnetizable material, in particular of plastic. It should be noted that, as already mentioned, the solenoid valve has an upper pole core, a lower pole core and a closing element with a magnet assembly. It is clear from this and also from the further description that the solenoid valve does not have an armature in the conventional sense.

By way of example, the closing element with the associated permanent magnet (in the case of a corresponding position of the components and energization of the two coils) can be repelled by the lower pole core and attracted by the upper pole core. Or, as an alternative, given different energization of the two coils, said closing element can be repelled by the upper pole core and attracted by the lower pole core. When a coil group having more than two coils is used, this effect can be produced by two of the coils. As an alternative, it is also conceivable for the effect to be achieved by several to all coils of the coil group, wherein the coil group is configured in such a way that the coils advantageously interact in order to achieve the desired result.

In a specific refinement, an upper coil and a lower coil are wound in opposite directions. Two magnetic fields of different orientation are produced by energization of the two coils in the same direction. In this case, the magnetic field of the upper coil magnetizes the upper pole core, which is situated closer, with a first orientation. At the same time, the magnetic field of the lower coil magnetizes the lower pole core, which is situated closer, with an opposite orientation. For example, the magnetization of the upper pole core attracts the upwardly pointing magnetic north pole of the permanent magnet. At the same time, the magnetization of the lower pole core repels the downwardly pointing magnetic south pole of the permanent magnet. Therefore, the coil group is configured such that actuation of a movement of the closing element is caused by activation of the coils. In this case, for example, two coils are energized, which two coils both have a magnetic influence on the closing element and as a result move the closing element. The dynamics and efficiency of the movement process are considerably improved as a result. The hydraulic brake system is understood to mean, in particular, a hydraulic brake system for a vehicle, for example for a motor vehicle, in particular for a passenger car.

Highly dynamic switching—even at low temperatures—is advantageously rendered possible by the described design of the valve. Similarly, only short current pulses are required for switching purposes. This is highly advantageous in modern vehicles. This creates an efficient valve. This efficiency has a far-reaching influence on further components. Therefore, for example, considerably smaller coils are required, or possible. As a result, the amount of copper used, and therefore costs, can be reduced in turn. Furthermore, heat-dissipating parts, in particular in the controller, can also be dispensed with or at least designed to be smaller. In addition to the increased efficiency, the solenoid valve is also advantageously distinguished by its simplicity. For example, a very simple design with few components is possible. This leads to cost-effective and resource-optimized production. Advantages in respect of a smaller installation space can also be achieved.

In an advantageous embodiment, the bistable solenoid valve is characterized in that the coils each assist the movement of the closing element from a first position to a second position and from the second position to the first position.

This is understood to mean that a first coil assists both the movement of the closing element from a first to a second position given appropriate energization and also a movement from the second position to the first position given different energization. Similarly, for example, a second coil assists both a movement of the closing element from a first to a second position given appropriate energization and also a movement from the second to the first position given different energization. The first position can be understood to mean, for example, the position in which the valve is closed by the closing element sitting on the valve seat. The second position can be understood to mean the position in which the valve is opened by a closing element being deflected away. A movement from the first to the second position is therefore an opening movement. A movement from the second position to the first position is accordingly a closing movement. In an advantageous refinement, the described assistance of the movement is to be understood to mean rendering possible the movement of the closing element by each coil. Highly dynamic switching of the valve can advantageously be achieved in this way.

In one possible refinement, the bistable solenoid valve is characterized in that at least two coils jointly cause the movement of the closing element from a first position to a second position and from the second position to the first position.

This is understood to mean that a plurality of (or else all of the existing) coils are activated for the opening process of the valve and these coils each have an influence on the closing element. Analogously, the coils are activated for the closing process and likewise each have an influence on the closing element. For example, (in the case of two existing coils) both coils are energized and act on the closing element by means of the magnetic field produced. It should be explicitly noted here that the coils each have a differentiable influence on the closing element, for example the first coil causes (by means of magnetization of the upper pole core) an attracting magnetic force on the magnetic north pole of the permanent magnet which is connected to the closing element and the second coil causes (by means of magnetization of the lower pole core) a repelling magnetic force on the magnetic south pole thereof. The resulting effect of the two coils can be the same, in particular to render possible the movement of the closing element. Here, the activation of the two coils takes place substantially at the same time. The duration of the activation is likewise substantially the same. A smaller valve can advantageously be rendered possible in this way. This saves installation space in the installed state and also material costs, in particular for copper, during production.

In a preferred embodiment, the bistable solenoid valve is characterized in that the coil group is designed in such a way that a first defined activation of a first coil causes repelling of the permanent magnet by the upper pole core and a first defined activation of a second coil causes attraction of the permanent magnet by the lower pole core, and in that a second defined activation of the first coil causes repelling of the permanent magnet by the upper pole core and a second defined activation of the second coil causes attraction of the permanent magnet by the lower pole core.

The term activation of a coil is understood to mean, in particular, energization with a defined current direction and voltage etc. For example, a first defined activation takes place with a defined positive voltage, while a second defined activation takes place with a defined negative voltage. As a result, an efficient solenoid valve, in which only short current pulses are required for switching purposes, is advantageously rendered possible.

In an alternative development, the bistable solenoid valve is characterized in that the coils are positioned one behind the other in the axial direction of the solenoid valve.

This is understood to mean that the coils are arranged in the movement direction of the closing element. As a result, different distances of the closing element from the coils are realized during a movement of the closing element. In this case, the coils can be configured as coil groups and form a component which can be preassembled. A preassembled coil group can be pushed, for example, onto the guide sleeve. This advantageously results in a simple design of the valve. Cost-effective production of the valve is likewise assisted in this way.

In an advantageous refinement, the bistable solenoid valve is characterized in that the coils generate magnetic fields of different orientation.

This is understood to mean that the coil group is designed in such a way that different magnetic fields are generated. For example, two coils can generate two magnetic fields of different orientation. In particular, magnetic fields are provided which are offset though 180 degrees; that is to say in the case of which the magnetic north poles and south poles are exchanged. Highly dynamic switching is advantageously rendered possible in this way.

In one possible embodiment, the bistable solenoid valve is characterized in that the coils have windings of different orientation.

This is understood to mean that the coils of the coil group are wound differently. For example, two adjacent coils have different windings. The windings differ, in particular, in respect of the direction of their windings. Windings of second coils, which windings are of different orientation, should be understood to be present when a magnetic field of different orientation is produced when a defined identical voltage is applied. A simple design of the solenoid valve is advantageously rendered possible in this way.

In a preferred development, the bistable solenoid valve is characterized in that the coils are designed such that they can be driven separately.

This is understood to mean that the valve and/or the coil group are/is configured in such a way that the individual coils can be driven individually. For example, contact-making arrangements are provided for each individual coil. Highly dynamic switching can advantageously be rendered possible with simple driving in this way.

In an alternative embodiment, the permanent magnet holds the closing element in a first stationery position on the lower pole core, or in a second stationery position on the upper pole core.

The disclosure furthermore provides a method for controlling a bistable solenoid valve for a hydraulic brake system, comprising a guide sleeve in which an upper and a lower non-moving pole core are arranged in a fixed manner and a closing element is arranged in a movable manner, wherein the closing element enters a valve seat during a closing movement and lifts out of the valve seat during an opening movement, and the closing element is connected to a permanent magnet in a fixed manner, wherein the permanent magnet is positioned between the lower and the upper pole core, and the coil group is positioned around the guide sleeve and substantially encloses said guide sleeve, which solenoid valve is characterized in that the coil group comprises at least two coils, wherein a movement of the closing element is actuated by means of activation of the at least two coils.

The term activation of a coil is understood to mean that the coil is driven. This driving can take place by means of energization with a defined voltage, current intensity and polarity. Provision is made here for at least two coils of the coil group to be activated. Therefore, the movement of the closing element takes place, for example, under the influence of two activated coils. Highly dynamic switching and also efficient switching can advantageously be rendered possible in this way.

In an advantageous embodiment, the method is characterized in that the at least two coils are activated in order to move the closing element from a first to a second position. This is understood to mean that the coils are activated jointly in order to render possible the movement of the closing element. A higher power can advantageously be rendered possible even with small coils in this way. As a result, material costs, for example for copper, can be saved.

In one possible development, the method for controlling a bistable solenoid valve is characterized in that the activation of the at least two coils takes place substantially simultaneously and/or the driving time of the at least two coils is of substantially the same length. Highly dynamic switching of the valve can advantageously be rendered possible even at low temperatures in this way.

In a preferred embodiment, the method for controlling a bistable solenoid valve is characterized in that the activation of the coils takes place with an opposite current direction when the windings of the coils are of the same orientation and/or the activation of the coils takes place with the same current direction when the windings of the coils are opposed.

This is understood to mean that different options for the structural design of the valve and also for driving of the valve are provided. The structure and control of the valve should advantageously be matched to one another. A simple overall concept can advantageously be rendered possible in this way. Driving of the two coils with the same current direction and intensity can take place in a particularly advantageous manner given coils which are wound oppositely. To this end, it is conceivable for a contact-making arrangement for the two coils to furthermore be sufficient. However, differentiated energization of the two coils leads to additional structural expenditure, in particular in respect of contact-making, but also renders possible individual driving of each individual coil.

In one possible development, the method for controlling a bistable solenoid valve is characterized in that the driving of at least one coil of the at least two coils is changed during the opening movement and/or during the closing movement in such a way that an impact momentum of the closing element against the respective pole core is reduced.

This is understood to mean that the noise behavior can be improved by changing the driving during the movement of the closing element. During switching, solenoid valves generate a noise which is produced when the air gap is closed by the energization of the magnet coil and the armature strikes the pole core. Since the magnetic force increases in an overproportional manner as the air gap becomes smaller, the acceleration at the moment of impact is at a maximum. The clicking noise which is caused by the impact momentum is judged to be disruptive by vehicle manufacturers. The configuration allows the described effect to be avoided or at least reduced. Owing to appropriate driving of the two magnet coils, a force which is opposite to the movement direction can be generated before the moving armature strikes the stationary pole core, said force braking the armature and thereby reducing or possibly even preventing the impact momentum. Solutions for NVH optimization which are matched to the different solenoid valves and intended uses can be defined by means of different driving times, polarities and current intensities. It is also conceivable here to energize a coil in the opposite direction in order to generate a magnetic force which counteracts the existing movement of the closing element in order to damp the movement of the closing element shortly before impact. In this case, the change in driving can relate only to one of the coils. It is also conceivable for the driving of several coils or all of the coils during the movement process to be varied.

BRIEF DESCRIPTION OF THE DRAWINGS

It should be noted that the features which are presented individually in the description can be combined with one another in any desired, technically appropriate manner and indicate further refinements of the disclosure. Further features and expediencies of the disclosure can be found in the description of exemplary embodiments with reference to the appended figures.

In the figures.

DETAILED DESCRIPTION

Figure 1:
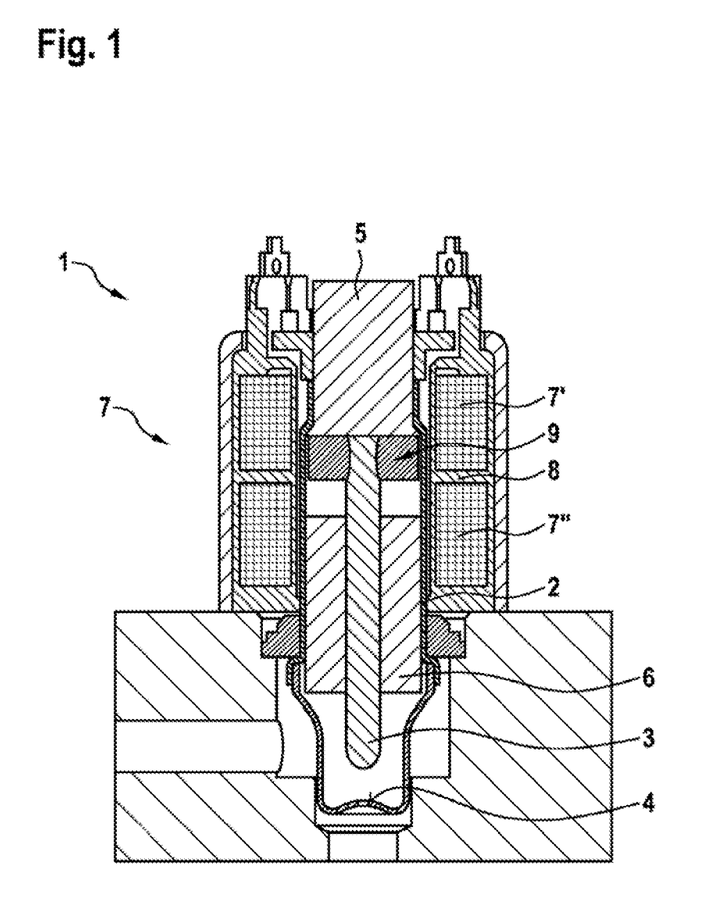
FIG. 1 shows a schematic sectional view of a bistable solenoid valve according to one embodiment of the disclosure.

FIG. 1 shows a schematic sectional view of a bistable solenoid valve. In this case, the solenoid valve 1 has a guide sleeve 2. An upper pole core 5 and a lower pole core 6 are anchored in said guide sleeve 2. Furthermore, a closing element 3 is positioned in a movable manner in the guide sleeve 2. A magnet assembly consisting of one permanent magnet 9 is connected to said closing element 3 in a fixed manner. To this end, the permanent magnet 9 is injection-molded onto the closing element 3. There is furthermore a coil group 7. The coil group 7 consists of two coils 7' and 7". The two coils 7' and 7" are separated from one another by an insulation 8. In this case, the coil group 7 is positioned around the guide sleeve 2. In this embodiment, the coil 7 is pushed onto the guide sleeve 2. The coil 7 encloses the guide sleeve 2 around its entire circumference. The length of the coil 7 and, respectively, the position of the upper pole core 5 and lower pole core 6 are selected, and respectively matched to one another, such that the coil 7 at least partially encloses the upper pole core 5 and lower pole core 6. On account of their function, the pole cores 5, 6 are also called magnetic field guiding bodies. In this case, the pole cores 5, 6 each protrude into the associated field coil 7', 7" of the coil group 7 and fill the field coils 7', 7" over a portion of their length. In a lower position, the closing element 3 interacts with the valve seat 4 in a sealing manner. In the event of a deflection out of said position, the closing element 3 releases the valve seat 4 and allows a hydraulic medium to flow, as illustrated in FIG. 1. In this case, the closing element 3 runs through a hole in the lower pole core 6 and is guided in this way.

Figure 2:
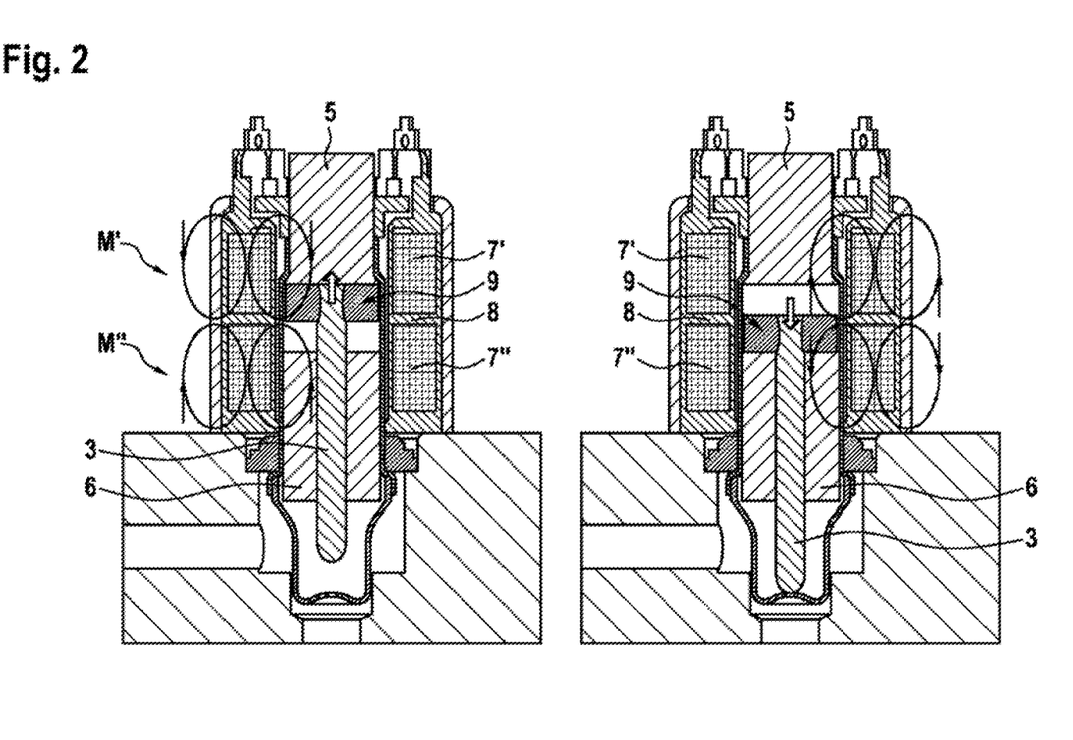
FIG. 2 shows a basic outline of the effective forces and movements given different energization according to one embodiment of the disclosure.

FIG. 2 shows a basic outline of the effective forces and movements given different energization. In this case, the illustration on the left-hand side shows the magnetic fields and effective forces given first energization of the two coils 7' and 7". In the illustrated embodiment, the two coils are wound oppositely. Here, a polarized magnetic field is generated by means of applying a defined first (for example positive) voltage to the first coil 7'. The illustrated oval line shows, by way of example, a magnetic field line M. The upper pole core 5 is also magnetized by said magnetic field. A polarized magnetic field is likewise generated by applying a defined first (for example positive) voltage to the second coil 7". The illustrated oval line shows, by way of example, a magnetic field line M". The lower pole core 6 is magnetized by said magnetic field. The magnetic fields which are produced are likewise opposed owing to the opposed windings. The magnetizations of the upper pole core 5 and of the lower pole core 6 are likewise oriented in opposite directions. The magnetization of the pole cores (and also the magnetic field which is generated by the coils 7' and 7") leads to interaction with the permanent magnet 9. For example, the permanent magnet 9 (or, for example, the lower magnetic south pole) is repelled by the lower pole core 6 which is magnetized in a polarized manner. At the same time, the permanent magnet 9 (or, for example, the upper magnetic north pole) is attracted by the upper pole core 5 which is magnetized in a polarized manner. This results in a movement of the axially movable permanent magnet, and also of the closing element 3 which is connected to said permanent magnet in a fixed manner, to the upper position. This force and also the resulting movement are illustrated by the upwardly directed arrow. In the upper position, the closing element 3 is held by the magnetic force of the permanent magnet 9 even after the energization of the coils 7' and 7" is removed. Therefore, the solenoid valve 1 is in a stable open state.

Furthermore, the illustration on the right-hand side of FIG. 2 shows the magnetic fields and effective forces given second energization. Here, a magnetic field which is polarized oppositely to the first defined voltage is generated by means of applying a defined second (for example negative) voltage to the first coil 7'. A magnetic field which is polarized oppositely to the first defined voltage is likewise generated by applying a defined second (for example negative) voltage to the second coil 7". The illustrated oval lines show, by way of example, magnetic field lines. Analogously to the previous description, the permanent magnet 9 (more precisely the lower magnetic south pole) is attracted by the upper pole core 5 which is magnetized in an oppositely polarized manner. At the same time, the permanent magnet 9 (more precisely the upper magnetic north pole) is repelled by the lower pole core 6 which is magnetized in an oppositely polarized manner. This results in a movement of the axially movable permanent magnet 9, and also of the closing element 3 which is connected to said permanent magnet in a fixed manner, to the lower position. In the lower position, the closing element 3 is held by the magnetic force of the permanent magnet 9 even after the energization of the coils 7' and 7" is removed. Therefore, the solenoid valve 1 is in a stable closed state.

Figure 3:
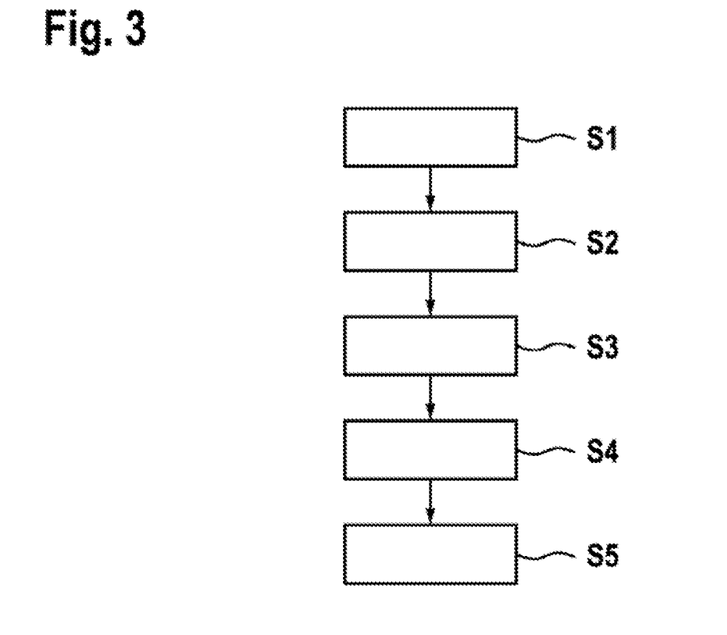
FIG. 3 shows an illustration of a method for controlling a bistable solenoid valve according to one embodiment of the disclosure.

Furthermore, FIG. 3 shows an illustration of a method for controlling a bistable solenoid valve according to one embodiment of the disclosure. Here, the closing element is held in a first position by means of magnetic force on one pole core in a first step S1. To this end, the closing element has, for example, one permanent magnet. The first and the second coil are substantially simultaneously activated in a second step S2. The two coils are activated by energization of the same orientation in the case of oppositely wound coils. Magnetic fields of different orientation are produced in the two coils in this way. Said magnetic fields lead to magnetization of the pole cores. This leads to a movement of the closing element from the first position to a second position in a step S3. If the desired second position is reached, the two coils are deactivated in a step S4. Furthermore, the closing element is then held in the second position by means of the magnetic force on the second pole core.

The invention claimed is:

1. A bistable solenoid valve for a hydraulic brake system, comprising:
   a guide sleeve;
   a non-moving upper pole core fixedly arranged in the guide sleeve;
   a non-moving lower pole core fixedly arranged in the guide sleeve;
   a permanent magnet positioned between the lower pole core and the upper pole core;
   a closing element arranged in the guide sleeve in a movable manner, the closing element configured to enter a valve seat during a closing movement and lifts out of the valve seat during an opening movement, the closing element fixedly connected to the permanent magnet; and
   a coil group positioned around the guide sleeve and substantially enclosing said guide sleeve, the coil group comprising at least two coils, the coil group configured such that activation of the at least two coils actuates of a movement of the closing element, wherein the coils of the at least two coils have windings of different orientation.

2. The bistable solenoid valve as claimed in claim 1, wherein each of the at least two coils is configured to assist the movement of the closing element from a first position to a second position and from the second position to the first position.

3. The bistable solenoid valve as claimed in claim 1, wherein the at least two coils jointly cause the movement of the closing element from a first position to a second position and from the second position to the first position.

4. The bistable solenoid valve as claimed in claim 1, wherein the coil group is designed in such a way that:

a first defined activation of the at least two coils causes a first coil of the at least two coils to act on the upper pole core in such a way that the permanent magnet is attracted to the upper pole core and causes a second coil of the at least two coils to act on the lower pole core in such a way that the permanent magnet is repelled by the lower pole core, and a second defined activation of the at least two coils causes the first coil to act on the upper pole core in such a way that the permanent magnet is repelled by the upper pole core and causes the second coil to act on the lower pole core in such a way that the permanent magnet is attracted to the lower pole core.

5. The bistable solenoid valve as claimed in claim 1, wherein the coils of the at least two coils are positioned one behind the other in an axial direction of the solenoid valve.

6. The bistable solenoid valve as claimed in claim 1, wherein the coils of the at least two coils generate magnetic fields of different orientation.

7. The bistable solenoid valve as claimed in claim 1, wherein the bistable solenoid valve is configured such that each coil of the at least two coils is driven separately of one another.

8. A method for controlling a bistable solenoid valve for a hydraulic brake system, which includes a guide sleeve, a non-moving upper pole core fixedly arranged in the guide sleeve, and a non-moving lower pole core fixedly arranged in the guide sleeve, the method comprising:

activating at least two coils of a coil group, which is positioned around the guide sleeve and substantially encloses the guide sleeve, to actuate a movement of a closing element, which is arranged in the guide sleeve in a movable manner and is configured to enter a valve seat during a closing movement and lift out of the valve seat during an opening movement, the closing element fixedly connected to a permanent magnet that is positioned between the lower pole core and the upper pole core, wherein windings of two coils of the at least two coils are opposed to one another, and the activation of the at least two coils includes activating the two coils with a common current direction.

9. The method for controlling a bistable solenoid valve as claimed in claim 8, wherein the activation of the at least two coils comprises at least one of:

activating each coil of the at least two coils substantially simultaneously; and activating each coil of the at least two coils for a driving time of substantially the same length.

10. The bistable solenoid valve as claimed in claim 1, wherein the upper pole core and the lower pole core are fixedly arranged inside the guide sleeve.

11. A method for controlling a bistable solenoid valve for a hydraulic brake system, which includes a guide sleeve, a non-moving upper pole core fixedly arranged in the guide sleeve, and a non-moving lower pole core fixedly arranged in the guide sleeve, the method comprising:

activating at least two coils of a coil group, which is positioned around the guide sleeve and substantially encloses the guide sleeve, to actuate a movement of a closing element, which is arranged in the guide sleeve in a movable manner and is configured to enter a valve seat during a closing movement and lift out of the valve seat during an opening movement, the closing element fixedly connected to a permanent magnet that is positioned between the lower pole core and the upper pole core, wherein the activation of the at least two coils includes changing a driving of at least one coil of the at least two coils during at least one of the opening movement and the closing movement in such a way that an impact momentum of the closing element against a respective pole core of the upper pole core and lower pole core is reduced.

12. The method for controlling a bistable solenoid valve as claimed in claim 11, wherein windings of two coils of the at least two coils are opposed to one another, and the activation of the at least two coils includes activating the two coils with a common current direction.

13. The method for controlling a bistable solenoid valve as claimed in claim 11, wherein windings of the at least two coils have a common orientation, and the activation of the at least two coils includes activating two coils of the at least two coils with opposite current directions.

14. The method for controlling a bistable solenoid valve as claimed in claim 8, wherein the upper pole core and the lower pole core are fixedly arranged inside the guide sleeve.

\* \* \* \* \*

UNITED STATES PATENT AND TRADEMARK OFFICE
CERTIFICATE OF CORRECTION

| | |
|---|---|
| PATENT NO. | : 11,383,686 B2 |
| APPLICATION NO. | : 16/613929 |
| DATED | : July 12, 2022 |
| INVENTOR(S) | : Stahr et al. |

It is certified that error appears in the above-identified patent and that said Letters Patent is hereby corrected as shown below:

In the Claims

In Claim 1, at Column 9, Lines 2-3: "actuates of a movement" should read --actuates a movement--.

Signed and Sealed this
Seventeenth Day of January, 2023

*Katherine Kelly Vidal*

Katherine Kelly Vidal
*Director of the United States Patent and Trademark Office*